United States Patent [19]
Campana et al.

[11] Patent Number: 5,602,915
[45] Date of Patent: Feb. 11, 1997

[54] PROCESS FOR THE CONTROL OF SECRET KEYS BETWEEN TWO SMART CARDS

[75] Inventors: Mireille Campana, Clamart; Henri Gilbert, Bures sur Yvette; David Arditti, Clamart, all of France

[73] Assignee: France Telecom Establissement Autonome de Droit Public, France

[21] Appl. No.: 201,979

[22] Filed: Feb. 25, 1994

[30] Foreign Application Priority Data

Feb. 25, 1993 [FR] France .................. 93 02152

[51] Int. Cl.$^6$ .................. H04L 9/08; H04L 9/00
[52] U.S. Cl. .................. 380/21; 380/23; 380/25; 380/28; 380/30; 380/44; 380/46; 380/49; 235/380
[58] Field of Search .................. 380/21, 23, 24, 380/25, 28, 30, 44, 46, 49, 50; 235/379, 380

[56] References Cited

U.S. PATENT DOCUMENTS

| 5,014,312 | 5/1991 | Lisimaque et al. | 380/25 |
| 5,227,613 | 7/1993 | Takagi et al. | 235/380 |
| 5,307,411 | 4/1994 | Anvret et al. | 380/25 |
| 5,428,684 | 6/1995 | Akiyama et al. | 380/25 |
| 5,461,217 | 10/1995 | Claus | 235/380 |

FOREIGN PATENT DOCUMENTS

| 0403656 | 12/1990 | European Pat. Off. | G06K 17/00 |
| 0422230 | 4/1991 | European Pat. Off. | G06K 19/073 |
| 0479617 | 4/1992 | European Pat. Off. | G07F 7/12 |
| 0500245 | 8/1992 | European Pat. Off. | G07F 19/00 |
| 2670036 | 6/1992 | France | G06F 13/38 |

*Primary Examiner*—Bernarr E. Gregory
*Attorney, Agent, or Firm*—Hayes, Soloway, Hennessey, Grossman & Hage, P.C.

[57] ABSTRACT

A process for controlling communication between a first and a second smart card using key-based cryptography is provided. In the disclosed process, a first identity code is stored in the first smart card and a second identity code is stored in the second smart card. The smart cards are customized by writing into each of the smart cards an identical group secret key and respective algorithms for processing the identical group secret key and the first and second identity codes stored in the first and second smart cards, respectively. The smart cards are used by transmitting the first identity code to the second smart card, transmitting the second identity code to the first smart card, and calculating using the respective processing algorithms stored in the smart cards, first and second session keys for the first and second smart cards, respectively.

7 Claims, 1 Drawing Sheet

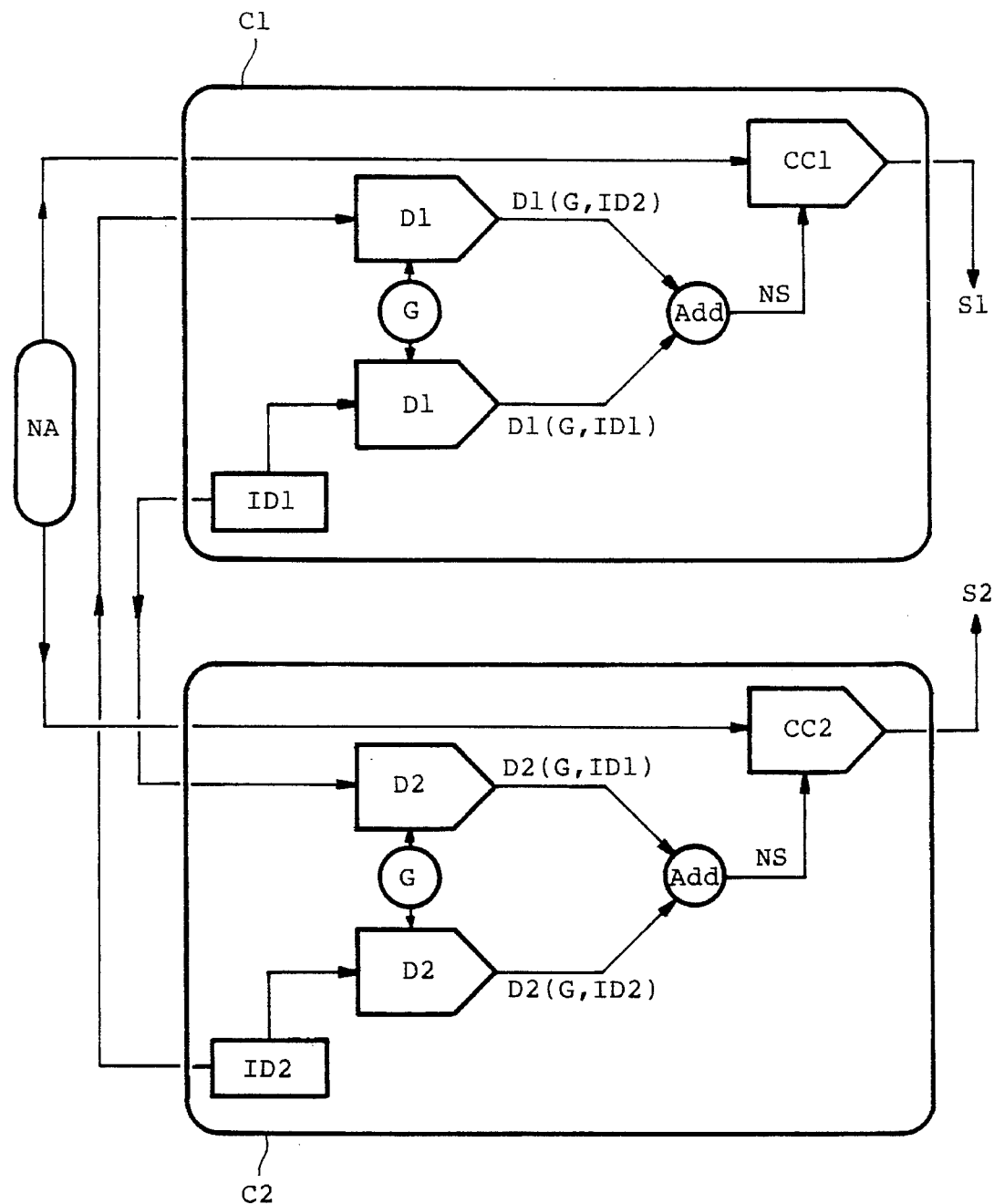

PROCESS FOR THE CONTROL OF SECRET KEYS BETWEEN TWO SMART CARDS

BACKGROUND OF THE INVENTION

1. Field of the Invention

The invention relates to a process for controlling or managing secret keys between two smart cards.

At present, smart cards are undergoing a high degree of development as data certification and authentication means, as a result of their capacity to store secret data.

The invention relates to all smart card types used for the authentication and certification of data and which are intended to be read by a data processing system having a smart card reader. For example, said smart cards can be cards of terminals communicating behind a switched network, such as the smart cards of fax machines or cash dispensers. Throughout the remainder of the present description, these smart cards will merely be referred to as cards.

2. Brief Description of Related Prior Art

In most card-based data processing systems, it is standard practice to use a central data base able to read the main smart cards, known as "mother cards". To said central data base are connected a plurality of data processing terminals able to read secondary smart cards known as "daughter cards". These terminals are then connected in accordance with a star architecture to the central data base. In accordance with this star architecture, the communication can only be established between the mother card and one of the daughter cards. Two daughter cards cannot communicate together, i.e. exchange information with one another.

In addition, a data processing system having such an architecture makes it possible to carry out secure transactions between the daughter cards and the mother cards, but they do not permit a mutual secure transaction between two daughter cards.

Such a data processing system also suffers from the disadvantage of requiring, during the establishment of a common session key between two smart cards, that each of the said cards has a personal secret key identical to the secret key of the other card with which it is wished to establish a common session key.

Such a data processing system using a microprocessor card and which implements a cryptographic algorithm is described in French patent applications FR-A-2 601 795 and 2 469 760 (corresponding to U.S. Pat. Nos. 4,811,393 and 4,471,216, respectively). Thus, these patent applications describe devices implementing a communication process between a mother card and daughter cards organized in star network manner. The operations which can be performed by these processes can consequently only take place between a mother card and the daughter cards with the aid of secret keys obtained by the diversification of the mother key (secret key of the mother card). Each secret key obtained in this way is consequently the result of a calculation involving the mother card and a parameter specific to the daughter card with which the mother card wishes to communicate. Therefore such a data processing system does not make it possible to implement a process using a common session key between two daughter cards.

Another known data processing system is described in a commercial note of the Centre common de FRANCE TELECCM and TDF, CCETT. This system has a multiservice microprocessor card known under the trade name "Mimosa". Such a multiservice microprocessor card uses a public key algorithm. Two cards of this type are able to authenticate one another. They can emit and verify signatures using the identity-based public key algorithm. Such a public key algorithm can also permit the establishment of a session key between two cards. This algorithm implements arithmetic operations (multiplications, powers, divisions) on numbers of several hundred bits. This calculation complexity makes it necessary, for producing such cards, to have top of the range components, which are at present very expensive.

SUMMARY OF THE INVENTION

The aim of the present invention is to obviate the disadvantages of the data processing systems described hereinbefore by proposing a process for the control of secret keys, whose implementation is simple and relatively inexpensive.

To this end, the invention relates to a process for the control of secret keys between two smart cams, in which a first identity code is stored in the first smart card and a second identity code in the second smart card. This process is characterized by the following phases:

a customization phase involving the following stages:
  writing in each of the smart cards a processing algorithm for the group secret key and identity codes,
  writing in each of the smart cards a same group secret key;
a utilization phase involving the following stages:
  the transmission of the first identity code to the second smart card,
  the transmission of the second identity code to the first smart card,
  calculation, by the processing algorithm, of a first and a second session keys respectively in the first and second smart cards.

The sane random number is supplied to each of the smart cards. Advantageously, the calculation stage of the first and the second session keys by the processing algorithm consists of the following stages:

the application of a diversification algorithm based on the first and second identity codes and the group secret key in order to determine a secret number, application of a calculation algorithm for the session keys based on the random number and the secret number.

According to an embodiment of the invention, the diversification algorithm comprises:

determining a first secret number on the basis of the first identity code and the group secret key stored in each of the memory cards, determining a second secret number on the basis of the second identity code and the group secret key, combining by a commutative operation said first and second secret numbers in order to obtain the secret number. This commutative operation can be an addition.

According to the preferred embodiment of the invention, the diversification algorithm and the algorithm for calculating the session key of the first and second smart cards are identical, the session keys obtained for the first and second smart cards then being identical.

Therefore this process has the advantage that two smart cards are able to communicate with one another and to authenticate one another by the use of their session key during an authentication operation.

Thus, as only the identity codes are transmitted from one card to the other, an intruder observing the communications between the two cards could not re-create the session key at the end of the protocol, because said intruder would not know as a result of listening the group secret key, because the latter is not transmitted between the cards.

This process also has the advantage that another card with the same group secret key as the communicating cards cannot determine the session key of said cards, because said key is dependent on two identity codes, whereof one is necessarily located in the card.

BRIEF DESCRIPTION OF THE DRAWING

The single drawing is a functional, architectural-level schematic diagram of one embodiment of the system of the present invention.

DETAILED DESCRIPTION OF EMBODIMENTS OF THE INVENTION

The drawing shows the operation for producing the session key common to the two smart cards C1 and C2 according to one embodiment of the present invention. For a better understanding of the invention, the session key based on card C1 will be designated S1 and that based on card C2 will be designated S2. For producing such session keys S1 and S2, the data processing system supplies a random number NA to each of the cards C1 and C2. In addition, each of the cards belongs to a group, i.e. each of the cards belongs to a set of cards having to communicate with one another. More specifically, a group represents the persons having to communicate with one another and carry out said communication pairwise protected from other correspondents of the group and those outside said group. In addition, apart from the random number NA received from the system, each of the smart cards C1 and C2 has a group secret key G. This group secret key is identical for each of the cards within the same group.

Each of the cards of said group (namely cards C1 and C2 in the drawing) has a personal identity code ID1 for card C1 and ID2 for card C2. The identity codes ID1 and ID2 are not secret, so that they can be passed from one card to another. In the drawing, the identity code ID1 is transmitted to the card C2 and the identity card ID2 to the card C1. In addition, on each of the cards C1 and C2 are written cryptographic algorithms, respectively designated D1 and CC1 and D2 and CC2.

Thus, the identity code ID1 supplied by the card C1 to the card C2 is introduced into the diversification algorithm D2 written in the smart card C2. On the basis of the identity code ID1 received in this way and the group secret key G, the diversification algorithm D2 determines a first secret number NS1, which is expressed in the form: NS1=D2 (G, ID1).

In parallel, said diversification algorithm D2 determines a second secret number NS2 on the basis of the identity code ID2 and the group secret key G. This second secret number is expressed in the form: NS2=D2 (G, ID2).

When the two secret numbers NS1 and NS2 have been determined by the algorithm D2, an Add function ensures the addition of these two secret numbers NS1 and NS2. The secret number resulting from this addition is designated NS.

The key calculation algorithm CC2 then uses this calculated secret number NS and also the random number NA supplied by the data processing system in order to produce the session key S2 of the smart card C2.

The diversification algorithm D2 and the key calculation algorithm CC2 are not described in greater detail, because they are known to the expert and described in the aforementioned French patent applications.

All the operations described for the card C2 are symmetrically performed by the card C1.

Thus, the diversification algorithm D1 written into the card C1 calculates the first secret number NS1=D1 (G, ID1) using the identity code ID1 belonging to it and using the group secret key G. In addition, said diversification algorithm D1 calculates the secret number NS2=D1 (G, ID2) using the identity code ID2 received from the card C2 and using the group secret key G. As in the case of the card C2, said secret numbers NS1 and NS2 are added by an Add function (or any commutative operation) to give the secret number NS. The key calculation algorithm CC1 then calculates the session key S1 on the basis of the random number NA received from the data processing system and the secret number NS calculated in the manner described hereinbefore.

For a better understanding of the invention, the diversification algorithms were designated D1 and D2, although they are identical to one another. This also applies with respect to the key calculation algorithms CC1 and CC2, which are also identical. It is clear that if the algorithms D1 and D2 and CC1 and CC2 are respectively identical, the session keys S1 for the key obtained by the card C1 and S2 for the key obtained by the card C2 are also identical. Thus, there is a session key common to the two cards C1 and C2.

It will be clear from reading the present description that any card in the possession of the group secret key G can establish a cannon session key with any random card of the same group, i.e. which also has the secret key G.

We claim:

1. A process for controlling communication between a first and a second smart card using key-based cryptography, in which a first identify code is stored in the first smart card and a second identity code is stored in the second smart card, said process comprising the steps of:

customizing said smart cards by:

writing into each of the smart cards an identical group cryptographic secret key, and writing into each of the smart cards respective algorithms for processing the identical group cryptographic secret key and the first and second identity codes stored in said first and second smart cards, respectively; and using said smart cards by:

transmitting the first identity code to the second smart card, transmitting the second identity code to the first smart card, calculating, by using said respective processing algorithms stored in said smart cards, first and second session keys for said first and second smart cards, respectively.

2. A process according to claim 1, wherein an identical random number is supplied to each of the smart cards, and the calculation of the first and second session keys by the respective processing algorithms includes the following steps:

applying a diversification algorithm for determining a secret number based on the first and second identity codes and the identical group secret key, and applying an algorithm for calculating the session keys based upon the random number and the secret number.

3. A process according to claim 2, wherein the diversification algorithm comprises:

determining a first secret key based upon the first identify code and the identical group secret key stored in each of the smart cards, determining a second secret number based upon the second identity code and the identical group secret key, and combining, by a commutative operation, said first and second secret numbers to obtain the secret number used by the algorithm for calculating the session keys.

4. A process according to claim 3, wherein the commutative operation performed on the first and second secret numbers in the diversification algorithm is an addition.

5. A process according to claim 4, wherein diversification algorithms for determining secret numbers in each said smart card and algorithms for calculating the session keys for the first and second smart cards are respectively identical, and the first and second session keys are identical.

6. A process according to claim 3, wherein diversification algorithms for determining secret numbers in each said smart card and algorithms for calculating the first and second session keys for the first and second smart cards are respectively identical, and the first and second session keys are identical.

7. A process according to claim 2, wherein diversification algorithms for determining secret numbers in each said smart card and algorithms for calculating the first and second session keys for the first and second smart cards are respectively identical, and the first and second session keys are identical.

* * * * *